K. HAAS.
EMERGENCY BRAKE.
APPLICATION FILED JUNE 24, 1913.

1,096,167.

Patented May 12, 1914.
3 SHEETS—SHEET 3.

Witnesses

Inventor
K. Haas.

Attorney

UNITED STATES PATENT OFFICE.

KALMAN HAAS, OF NEW YORK, N. Y.

EMERGENCY-BRAKE.

1,096,167.  Specification of Letters Patent.  Patented May 12, 1914.

Application filed June 24, 1913. Serial No. 775,507.

*To all whom it may concern:*

Be it known that I, KALMAN HAAS, a citizen of the United States, residing at New York, in the county of New York and State of New York, have invented certain new and useful Improvements in Emergency-Brakes; and I do hereby declare the following to be a full, clear, and exact description of the invention, such as will enable others skilled in the art to which it appertains to make and use the same.

This invention relates to new and useful improvements in car brakes, and has for its object to provide an emergency brake which will eliminate accidents to both the occupants of the car and pedestrians when crossing the tracks.

Another object of my invention is to provide a device in which the brake is brought in contact with the track and operates directly thereon instead of through the medium of the wheels.

A still further object of my invention is to provide a track brake which is capable of carrying the entire weight of the car should it be desirable at any time to raise the wheels from their position on the track.

Figure 1:
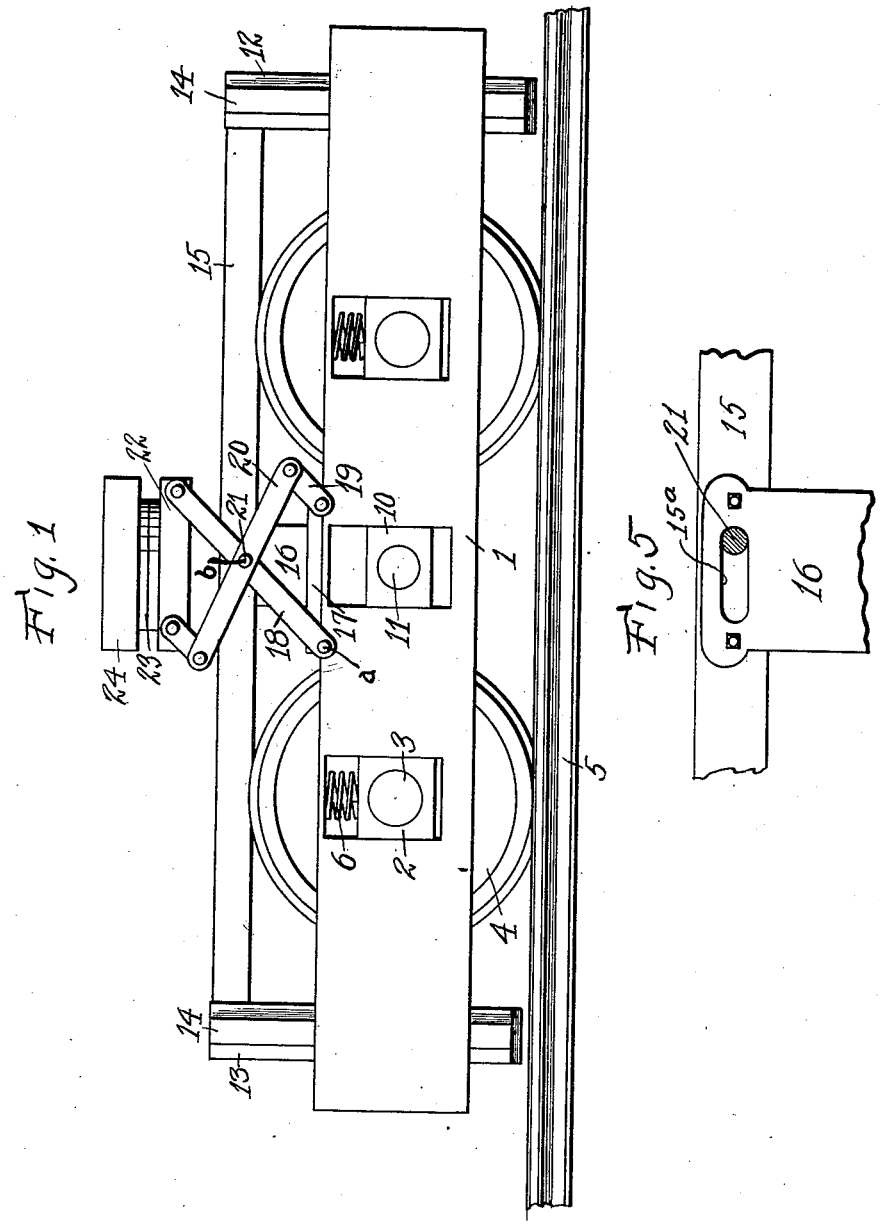
Figure 2:
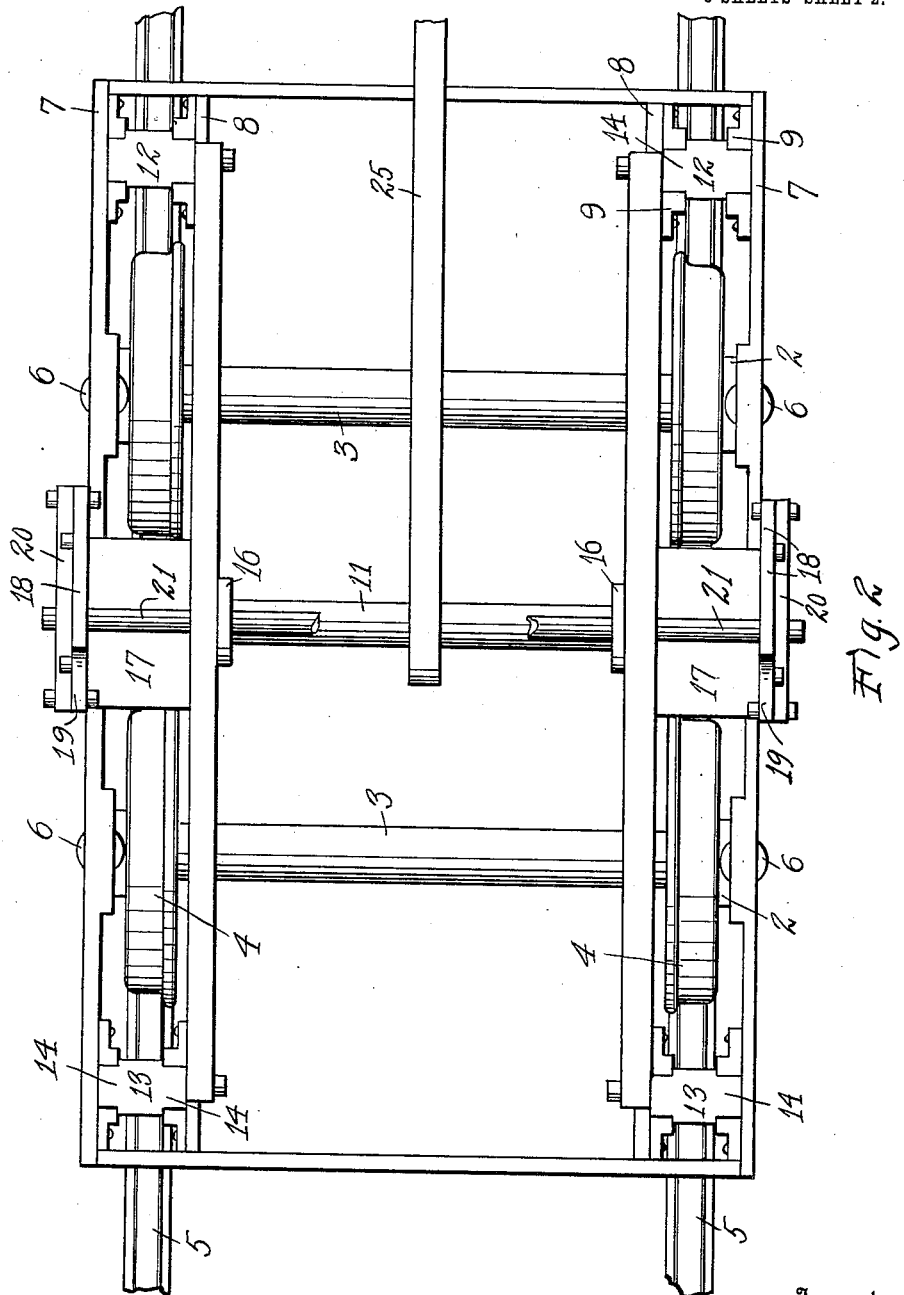
Figure 3:
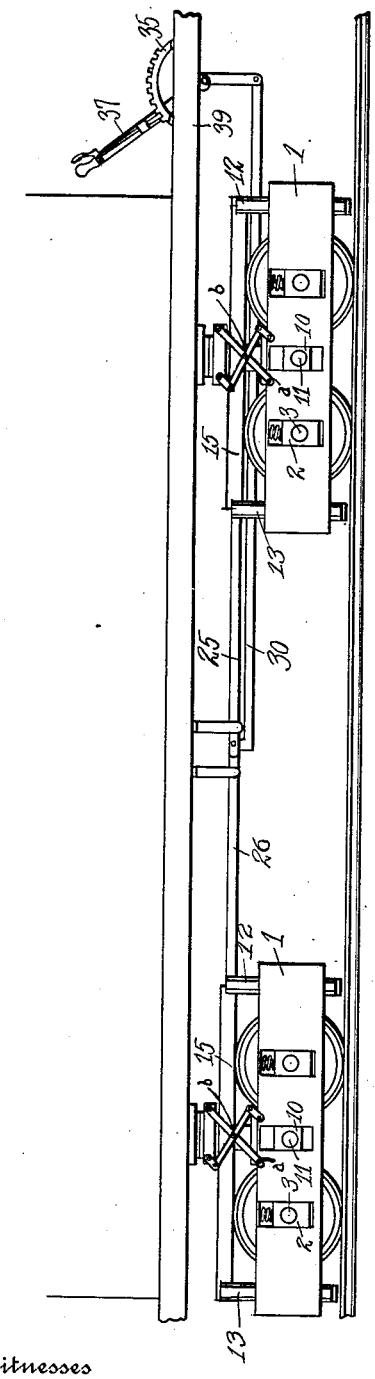
Figure 4:
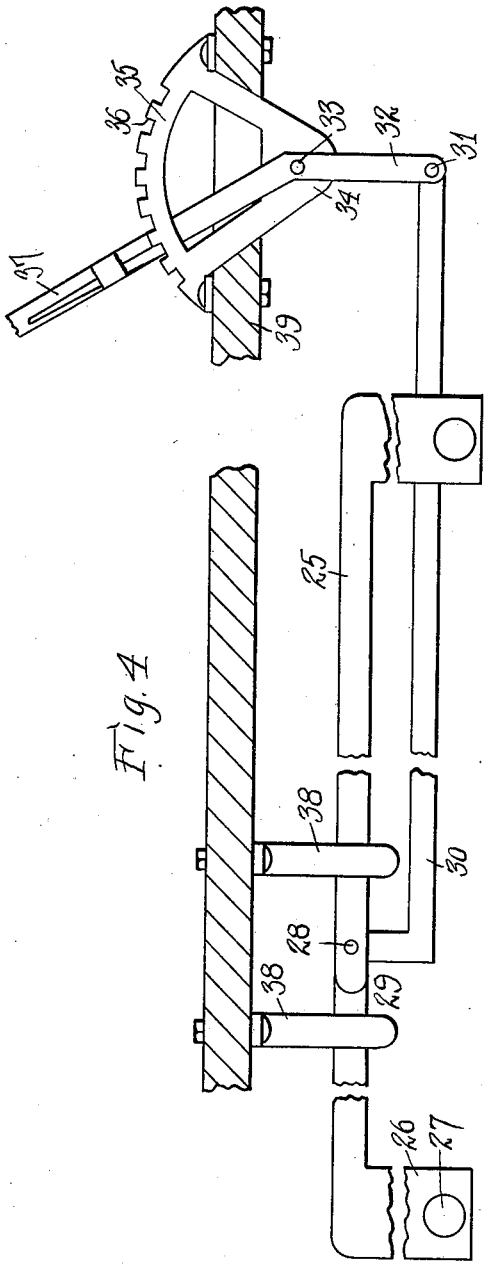

With the above and other objects in view, I will now proceed to describe my invention in the following specification and accompanying drawings, in which, Figure 1 is a view in elevation of one of the trucks showing my improved track brake applied thereto; Fig. 2 is a top plan view of Fig. 1; Fig. 3 is a view of a car showing my improved track brake applied thereto, and the levers by means of which the brake is operated; Fig. 4 is a detail view of the lever mechanism showing the means by which the same is connected; and Fig. 5 is a detail view of a fragment of the bar connecting the vertically slidable posts.

Referring to the drawings by characters of reference, 1 indicates the usual frame of a truck, having slidably mounted therein the usual journals 2, through which the axles 3 are adapted to extend. The wheels 4 are secured to the axles in the usual manner and are adapted to operate on the track indicated at 5. The usual spring 6 is interposed between the upper surface of the journal bearing 2 and a suitable rest carried by the truck frame. The truck frame comprises the two members 7 and 8, which are provided on their inner surfaces with the guides 9, through which the track brake is adapted to slide. Intermediate the journal bearings I provide an auxiliary journal bearing 10, which is slidably mounted in the truck frame and carries a shaft 11, to which the operating levers are attached.

My improved brake comprises the two members 12 and 13, having formed integral therewith the guides 14, which are slidable between the guides 9 carried by the truck frame. A suitable bar 15 is rigidly connected with the track brakes 12 and 13 and is adapted to slide vertically when the device is in operation. A vertical bar 16 is rigidly connected with the bar 15 and has secured adjacent its lower extremity a shaft 11, by means of which the bar is slid downwardly at the time the brakes are being applied. These bars 15 and 16 are each provided with the registering slots 15$^a$, the use of which will appear hereinafter.

Intermediate the ends of the truck frame, and directly over the journal 10, I preferably provide a plate 17 which has pivotally secured to one end one lever of the lazy tongs, indicated at 18, and at its opposite end a link 19 which, in turn, is pivotally secured to the opposite lever 20 of the lazy tong. The levers 18 and 20 are pivoted intermediate their ends, as indicated at 21, and their extremities opposite the plate 17 are pivotally secured to a plate 22 in a manner previously described. The pivot bar 21 extends transversely across the truck frame and through the slots 15$^a$ formed in the bars 15 and the vertical bars 16 as will be clearly seen in Figs. 2 and 5. The plate 22 extends transversely of the truck frame and is pivotally mounted, as illustrated at 23, to a bolster 24 which, in turn, is secured to the body of the car.

A suitable L-lever 25 is provided at one extremity with an angular extension 26, having therein an aperture 27 which is adapted to surround the shaft 11 and when the device is in operation move said shaft vertically. The end of the lever, opposite the angular extension 26, is provided with an aperture through which a pin 28 is adapted to extend and pivotally connect an angular extension 29 formed on a link 30 therewith. The end of the link 30, opposite the angular extension 29, is pivotally connected as illustrated at 31 to a lever 32 which, in turn, is pivotally mounted at 33 on an ear 34 formed integral with the segment 35. This segment 35 is provided with the notches 36 in which a pawl 37 carried by the lever 32 is adapted to seat. This pawl 37 is slidably mounted on the lever and is adapted to be actuated by means of the releasing mechanism carried by the upper end of the lever 32.

Suitable guides indicated at 38 are secured to the body of the car at desired points and are adapted to hold the levers and links in operative relation and thereby prevent the same from coming out of alinement.

The segment 35 is placed at any desired point on the platform of the car, indicated at 39, and is secured thereto in any preferred manner.

In operation it will be clearly seen that when the lever 32 is pushed forwardly the bar 30 will slide rearwardly, thereby causing the L-bar 25 to slide therewith, which will permit the truck to move rearwardly with relation to the body of the car, and in that manner permit the lazy tongs to partially close, thus lowering the rod 21 and the track brakes, and raising the wheels from the rails. When it is desired to bring the car to its normal position, the lever is returned to the position indicated in Fig. 3, which will slide the bar 30 longitudinally in a forward direction and through the means of the L-shaped bar 25, cause the lazy tongs to contract and thereby hold the car in its normal elevated position.

It will be apparent that in the movement of the truck the pivot $a$ of the lazy tongs will act as a center around which the free end of one of the bars swing, thus lowering the track brake until the bars 12 and 13 come into contact with the track, at which time the pivot $b$ will act as the center and upon further movement of the truck with relation to the body of the car it will be apparent that said truck will be raised and the weight of the car supported on the bar 15, which is rigidly connected to the bars 12 and 13 of the track brake.

While in the foregoing I have shown and described the preferred embodiment of my invention, I wish it to be understood that I may change the specific arrangements of parts without in any way departing from the spirit and scope of my invention.

Having thus fully described my invention, what I claim is:

1. In a railway brake, a car truck, members slidably mounted on said car truck, bars connecting said members, lazy tongs connecting the truck with the body of the car, bars slidable longitudinally with relation to the said car body, L-shaped projections formed integral with the longitudinally slidable bars, said L-shaped projections connected to the trucks, and means to slide the bars longitudinally.

2. In combination with a railway car, an emergency brake comprising members slidably mounted on the trucks of said car, said members adapted to slide vertically with relation thereto, lazy tongs connecting said trucks to the car body, bars connecting the vertically slidable members, the central point of the lazy tongs being connected to the bars and adapted to cause the same to slide with relation to the trucks when the device is in operation.

3. In combination with a railway car, trucks mounted thereon, members slidable through said trucks, bars connecting said members, lazy tongs connected between the car body and the trucks, said lazy tongs being adapted to support the car body, L-shaped bars extending longitudinally of said car body and connected to the trucks, said L-shaped bars being connected at their opposite ends with a longitudinally slidable link, and a lever for sliding said link longitudinally.

4. In combination with a car truck, members slidable vertically with relation to said car truck, a bar connecting said members, lazy tongs connecting the truck to the car body, the central pivotal point of the lazy tongs being slidably connected to the bar, and means to operate said lazy tongs.

5. An emergency brake comprising the combination of members slidably mounted on a car truck, a bar connecting said members, lazy tongs connecting said car truck with the car body, an L-shaped bar connected to said car truck, said L-shaped bar extending to the center of the car body, a link connected to the L-shaped bar, the opposite end of said link being connected to a lever, whereby upon operation of the lever the brake may be lowered and the trucks raised.

In testimony whereof I affix my signature in presence of two witnesses.

KALMAN HAAS.

Witnesses:
SIMPSON HAAS,
MEYER HAAS.